(12) United States Patent
Lucidarme et al.

(10) Patent No.: US 11,747,161 B2
(45) Date of Patent: Sep. 5, 2023

(54) REPLENISHING STATION ASSIGNMENT

(71) Applicant: ELECTRICITE DE FRANCE, Paris (FR)

(72) Inventors: Thierry Lucidarme, Chevreuse (FR); Paul Breslow, San Carlos, CA (US); Baptiste Bel, Nouaille Maupertuis (FR)

(73) Assignee: ELECTRICITE DE FRANCE, Paris (FR)

( * ) Notice: Subject to any disclaimer, the term of this patent is extended or adjusted under 35 U.S.C. 154(b) by 869 days.

(21) Appl. No.: 16/564,820

(22) Filed: Sep. 9, 2019

(65) Prior Publication Data

US 2021/0070192 A1  Mar. 11, 2021

(51) Int. Cl.
*G01C 21/36* (2006.01)
*G01C 21/34* (2006.01)
*G05D 1/02* (2020.01)

(52) U.S. Cl.
CPC ..... *G01C 21/3679* (2013.01); *G01C 21/3469* (2013.01); *G01C 21/362* (2013.01); *G05D 1/0217* (2013.01)

(58) Field of Classification Search
CPC .................................................. G01C 21/3469
USPC ......................................................... 701/22
See application file for complete search history.

(56) References Cited

U.S. PATENT DOCUMENTS

| | | | |
|---|---|---|---|
| 8,949,028 B1* | 2/2015 | Klampfl | G01C 21/3423 |
| | | | 701/538 |
| 10,873,099 B1* | 12/2020 | Gurunathan | H02J 7/0027 |
| 2016/0272074 A1* | 9/2016 | McGrath | B60L 53/305 |
| 2017/0141368 A1* | 5/2017 | Ricci | H01G 11/78 |
| 2018/0304759 A1 | 10/2018 | Chase et al. | |
| 2018/0321050 A1 | 11/2018 | Chase et al. | |
| 2018/0339602 A1* | 11/2018 | Lang | G06Q 10/02 |
| 2018/0376305 A1* | 12/2018 | Ramalho de Oliveira | |
| | | | H04W 4/44 |
| 2019/0016312 A1 | 1/2019 | Carlson et al. | |
| 2019/0126766 A1* | 5/2019 | Taguchi | B60L 53/36 |
| 2020/0104965 A1* | 4/2020 | Ramot | G06Q 10/06315 |
| 2020/0391608 A1* | 12/2020 | Wang | B60L 53/67 |
| 2020/0403444 A1* | 12/2020 | Yamada | H02J 13/00036 |
| 2021/0074094 A1* | 3/2021 | Schumacher | B60L 53/65 |
| 2021/0291687 A1* | 9/2021 | Ferguson | G05D 1/0083 |

OTHER PUBLICATIONS

SFMTA, "Powered Scooter Share Mid-Pilot Evaluation," Technical Report, San Francisco Municipal Transportation Agency (SFMTA), 2019, retrieved from internet website: https://www.sfmta.com/sites/default/files/reports-and-documents/2019/08/powered_scooter_share_mid-pilot_evaluation_final.pdf on Aug. 11, 2021, 28 pages.
Extended European Search Report and Search Opinion issued in related application EP 20195006.0, dated Dec. 4, 2020, 7 pages.

* cited by examiner

*Primary Examiner* — Charles A Fox
*Assistant Examiner* — Michael E Butler
(74) *Attorney, Agent, or Firm* — Faegre Drinker Biddle & Reath LLP

(57) ABSTRACT

Example implementations relate to replenishing an energy reserve of a vehicle of interest located in a zone of interest. Such examples comprise emitting, from a computer system and towards a vehicle controller of the vehicle of interest, instructions to direct the vehicle of interest towards a specific replenishing station located in the zone of interest. The specific replenishing station is assigned for replenishing the vehicle of interest based on a set of statistical data.

32 Claims, 6 Drawing Sheets

REPLENISHING STATION ASSIGNMENT

BACKGROUND

This invention generally relates to the replenishing of the energy reserve of a vehicle by assignment of a replenishing station.

Presently vehicles replenish their energy reserve in a reactive fashion, for example by replenishing their energy reserve at a nearby replenishing station when their energy reserve is reaching a low level.

While the results for such a mode of operation are satisfactory for a number of vehicle users, replenishing the energy reserve of a vehicle at a nearby replenishing station when at a low level may lead to a delay if the vehicle happens to have a low energy reserve level prior to a relatively long trip.

The present invention aims at resolving this situation.

BRIEF DESCRIPTION OF THE DRAWINGS

FIG. 2b is a diagram of an example representation of a statistical data set related to the zone of interest of FIG. 2a.

FIG. 3b is a diagram of an example representation of a statistical data set related to the zone of interest of FIG. 3a.

DETAILED DESCRIPTION

Figure 1:
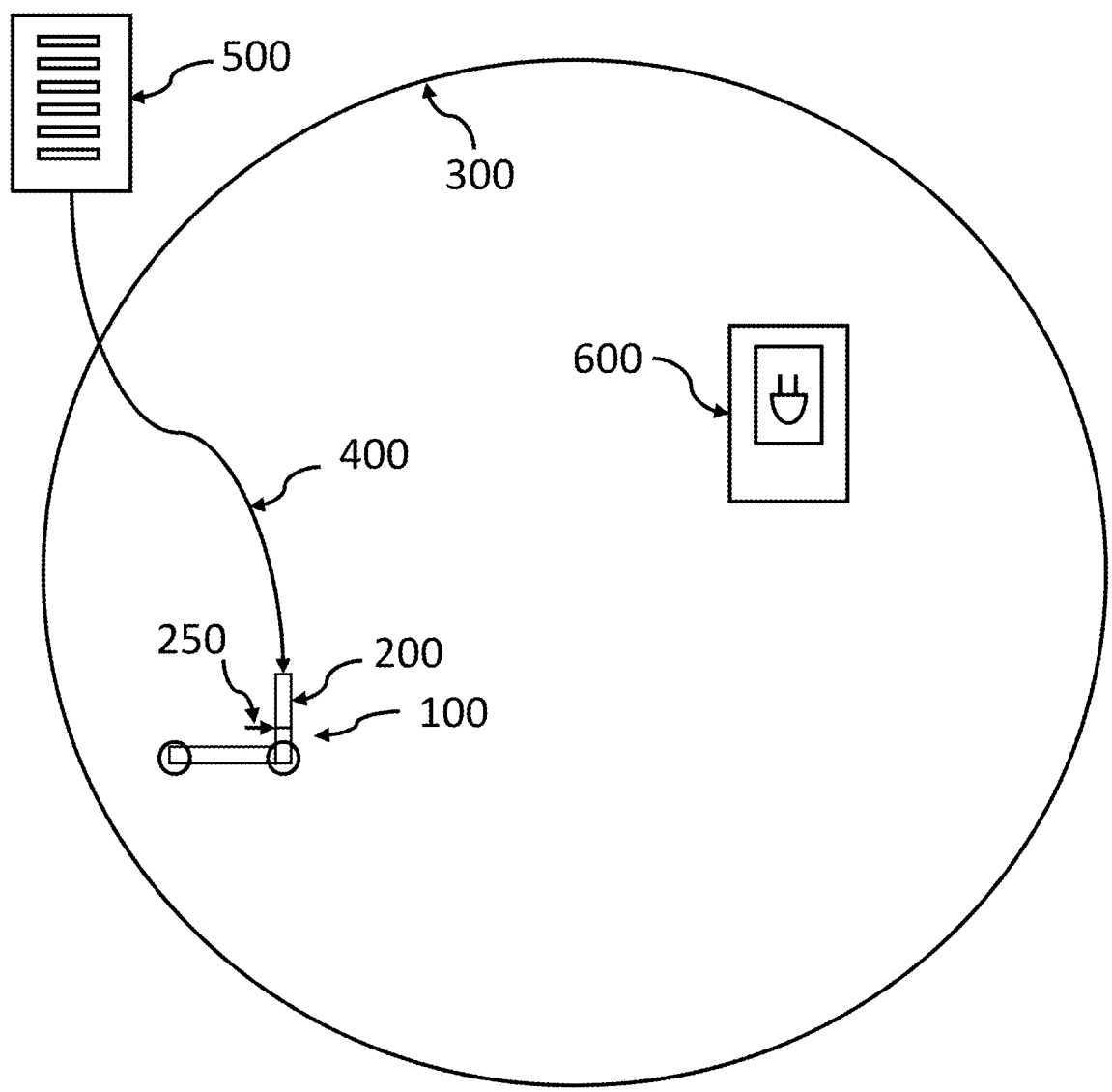
FIG. 1 is a diagram of an example zone of interest.

Transportation may proceed in a number of different manners, for example using private vehicles such as cars, vehicles pertaining to public transit fleets such as taxi, subway system or buses, shared vehicles using for example an application available on mobile terminals, or light personal transportation such as bikes. Most vehicles comprise an energy reserve which may be periodically replenished at a replenishing station.

In some examples of the invention such as related to public transit fleet or to shared vehicles, applying the method of the invention may help reduce a waiting time by helping maintaining vehicles having an energy reserve level in line with a user request. Such reduction of waiting time may result in an increased use of such public or shared transport, thereby benefiting general traffic.

The present invention proposes assigning a specific replenishing station for a vehicle of interest based on statistical data. Relying on statistical data for replenishing station assignment was found to solve a number of different issues by taking into account statistical data related for example to a past or predicted behavior to assign a specific replenishing station or another. Relying on statistical data for such replenishing station assignment provides a number of advantages which will be illustrated in the following examples. Statistical data may comprise a collection of numerical data. Statistical data may comprise an organized collection of numerical data. Statistical data may comprise a collection of numeric values, items of information, or other facts which are grouped into classes.

A vehicle of interest according to this invention may be a transporting device such as a car, a bike, a scooter, a tricycle, a rail vehicle, a watercraft, an amphibious vehicle or an aircraft such as an airplane, helicopter or drone. The vehicle of interest according to this invention may in some examples such as the examples illustrated below be configured to provide one of water based, air based, or ground based transportation. In some examples such as illustrated below, the vehicle of interest may have a vehicle autonomy or vehicle range, the vehicle autonomy representing a maximum energy reserve level, the vehicle autonomy being for example measured by a distance which the vehicle may travel when the energy reserve of the vehicle is full. A vehicle autonomy may for example be of about 100 kilometers. In another example, a vehicle autonomy may be of about 1000 kilometers. In another example, a vehicle autonomy may be of about 10 kilometers. It should be understood that the vehicle autonomy may for example be calculated using theoretical trip conditions or defining the type of path which may be travelled. In some examples, the vehicle of interest according to the invention includes a mechanical device whereby a user of the vehicle may transfer mechanical energy produced by the user to the vehicle, for example through pedals, whereby such transferred mechanical energy is used by the vehicle in addition to the energy reserve of the vehicle. In some examples, the vehicle of interest according to the invention includes energy generation devices such as solar cells. The method according to the invention may enable modifying a design or structure of vehicles in order to adjust, increase or decrease the energy reserve autonomy or maximum capacity of a vehicle. The method according to the invention may also enable adjusting other characteristics or design features of vehicles in order to match user requests based on the statistical data set. Such modifications or adjustments may be obtained following an analysis of the statistical data set.

The vehicle of interest may be a privately owned vehicle for personal and exclusive use of its owner. The vehicle of interest may be privately owned and used for commercial purposes. The vehicle of interest may be configured for people, freight or package transportation. The vehicle of interest may be one of a shared vehicle, an autonomous vehicle, or a shared autonomous vehicle, which may pick up and transport a user from a pick up point to a drop off point. In some examples, the vehicle of interest is a vehicle configured to transport more than 9 individuals. In some examples, the vehicle of interest is configured to transport less than 10 individuals. In some examples, the vehicle of interest is configured to transport less than 6 individuals. In some examples, the vehicle of interest is configured to transport less than 3 individuals. In some examples, the vehicle of interest is configured to transport less than 2 individuals. Being configured to transport a number of individuals may correspond to a number of seating or standing locations in or on the vehicle of interest. In some examples, the vehicle weighs, when empty, more than 1000 kilos. In some examples, the vehicle is a light vehicle. In some examples, the vehicle weighs, when empty, less than 100 kilos. In some examples, the vehicle is supported by 4 wheels. In some examples, the vehicle is supported by 3 wheels. In some examples, the vehicle comprises a self-balancing gyro system in order to facilitate transportation or displacement, with or without user. In some example the vehicle comprises an additional set of wheels which may be for example retracted under a load threshold, or may be used under specific circumstances such as, for example, to avoid tipping over. Some vehicles may for example have 5 wheels, 2 of which being used under specific circumstances, the other 3 being permanently used.

The vehicle according to the invention may comprise a number of characteristics, which include for example an energy type, a power level or a mechanical structure.

The vehicle of interest according to this invention comprises an energy reserve. An energy reserve may comprise energy used for propulsion of the vehicle. An energy reserve may comprise energy used for auxiliary systems of the vehicle, whereby auxiliary systems do not directly relate to propulsion, but for example to heating, air conditioning, lights or powering computing resources. An energy reserve may comprise one or more physical containers, such physical container comprising a material which stores energy. Such material storing energy may store the energy in a chemical form, for example in the form of fuels releasing thermal energy through combustion, in an electrochemical form, for example in the form of a battery releasing electrical energy when connected, of in a physical form, for example in the form of compressed air releasing mechanical energy in the form of pressure. Such energy reserve may be of different types, such energy type being for example a characteristic of the vehicle. In some examples such as the examples illustrated below, the energy reserve comprises one or more of an electrical battery, for example comprising one or more electrochemical cells, a fossil fuel reservoir, the fossil fuel being for example derived from petroleum, coal or natural gas, a compressed air reservoir or a hydrogen reservoir. The energy reserve may comprise more than one energy type, for example both an electrical battery and a petrol reservoir. In some examples, the vehicle of interest is a hybrid electrical and fossil fuel vehicle or an all electrical vehicle. In some examples the energy reserve comprises an electrical battery having a capacity or autonomy of about 1 kWh when fully charged or filly replenished. In some examples the energy reserve comprises an electrical battery having a capacity of about 5 kWh. In some examples the energy reserve comprises an electrical battery having a capacity of about 10 kWh. In some examples the energy reserve comprises an electrical battery having a capacity of more than 25 kWh. In some examples the energy reserve comprises an electrical battery having a capacity of more than 50 kWh. In some examples, the electrical battery is configured to be a swappable battery. An example swappable battery may comprise a handle. An example swappable battery may comprise electrical battery connectors. An example vehicle holding a swappable electrical battery may comprise a battery socket, the battery socket being accessible to swap a battery. Using swappable batteries permits replenishing an energy reserve of a vehicle almost instantly by swapping the battery.

Another example of characteristic of the vehicle is the power level of the vehicle. While some vehicles may have a relatively high power level, such as vehicles used for example for transporting freight or groups of more than 9 individuals, some vehicles may have power levels adapted to transportation of a family, such as a car, or of a single individual, such as a scooter or electrical bike. While some vehicles may function at a power level of about 500 or 1,000 watts, some other vehicles may function at power levels of about 50,000 watts or of about 100,000 watts. The power level of a vehicle is very dependent on the vehicle type, and has a strong impact on the energy reserve levels of the vehicle. Some vehicles may function at a very high power level of more than 100,000 watts. Examples of very high power vehicles would include heavy ground transportation, water based transportation or planes.

A further characteristic of a vehicle may be linked to its mechanical structure. Mechanical structure also indeed has an impact on the handling of the energy reserve of a vehicle. The type of traction is an example of mechanical structure category, whereby the number of wheels, or the number of driving wheels impacts handling of the energy reserve. A vehicle weight, shape or aerodynamics is also an example of such a characteristic, as well as the fact that a vehicle may be a cabriolet, sedan or sports utility vehicle for example.

While a number of vehicle characteristics have been exemplified here, other characteristics may be considered which impact on energy consumption and therefore on energy reserve levels without being directly linked to the vehicle, but to the nature of its use, for example due to the vehicle structure, or due to the use of a specific vehicle. It is for example more likely that a cabriolet be used in dry and warm weather conditions, whereas an all-wheel drive vehicle is more likely to be used in adverse weather conditions. All such characteristics may impact directly or indirectly the use of energy of the vehicle of interest, and also may thereby impact on replenishment according to some examples of the invention.

A vehicle of interest according to this invention may comprise a vehicle controller, the vehicle controller comprising for example a vehicle processor comprising electronic circuits for computation managed by an operating system, a vehicle memory comprising integrating circuits for storing information for use by a processor, and a vehicle networking device for communication and interaction between devices on a computer network.

A vehicle of interest according to this invention may comprise a vehicle localizing or positioning device, the vehicle localizing device comprising for example a satellite based radio-navigation system device such as GPS or Global Positioning system device in order to estimate the position of the vehicle. Speed and acceleration may be derived from the position of the vehicle. Position, speed and acceleration all may impact on energy reserve levels according to some examples of the invention.

A vehicle of interest according to this invention may combine a number of features as described in this description. An example of such a vehicle may be a shared all electrical scooter comprising an electrical energy reserve in the form of a swappable battery, the scooter comprising a scooter controller such that the scooter may exchange data with a computer network, the scooter comprising three wheels, the scooter being configured for transportation of a single individual, the scooter having an autonomy of about 10 kilometers, whereby the scooter controller may implement a method for replenishing an energy reserve according to examples of the invention. An another example of such a vehicle may be a privately used car comprising a petrol engine, the car being configured to transport up to 5 individuals with luggage, whereby a driver of the privately used car may rely on a mobile terminal such as, for example, a cell phone, the cell phone comprising a cell phone controller and a localizing device such as a GPS device, to implement a method for replenishing an energy reserve according to some examples of the invention.

The vehicle of interest according to the invention is located in a zone of interest. The zone of interest may be a geographical area. The zone of interest may be a simply connected space. The zone of interest may be a space which is not simply connected. The zone of interest may cover a city or a city district. The zone of interest may cover a suburban area, such as, for example, a close suburb zone or a far suburb zone. The zone of interest may be associated to a range of density of population. In an example, the zone of interest has a density of population of more than 10,000 habitants per km2 or square kilometers. In an example, the zone of interest has a density of population of less than 5,000 habitants per km2. In an example, the zone of interest has a density of population of less than 1,000 habitants per km2. The zone of interest may comprise a network of interconnected streets or roads. The zone of interest may comprise sub-zones of interest. In some examples, the zone of interest is homogeneous, whereby any subzone representing at least 5% of the zone of interest by surface has a population density of between 120% and 80% of an average population density of the homogeneous zone of interest. A zone of interest may cover less than 100 km2. A zone of interest may cover less than 10 km2. A zone of interest may cover more than 1 km2. A zone of interest may comprise dedicated path ways, whereby dedicated pathways are pathways dedicated to a specific vehicle type such as, for example, bike dedicated path ways, scooter dedicated pathways, shared vehicle dedicated pathways or electrical vehicle dedicated pathways. A zone of interest according to the invention may cover a volume, for example when the invention applies to air borne vehicles. A zone of interest according to the invention may cover a surface area. A zone of interest according to the invention may cover several superposed levels at different altitude, for example including a bridge or a tunnel. A zone of interest may comprise another zone of interest. A zone of interest may be adjacent to another zone of interest. Multiple zones of interest may cover an urban area including one or more city center zones of interest and one or more suburban zones of interest. A zone of interest may correspond to an administratively defined geographical area such as a specific city or a specific city district. A plurality of zones of interest may correspond to a grid like pattern, whereby each zone of interest corresponds to a cell of a grid, such zones of interest forming for example a series of squares or rectangles. A zone of interest may be substantially circular or substantially oval, for example when such zone of interest is a city center or downtown zone of interest. A zone of interest may be substantially in the shape of an annulus, for example when such a zone is a suburban zone of interest, for example surrounding a city center zone of interest. A zone may also be defined by taking into account geographical characteristics, such as a mountainous zone, a seaside zone, a forest zone or a plateau zone, for example. A zone may be defined based on different factors including a zone corresponding to a specific dispatching zone, a specific dispatching zone being a zone in which vehicles are being dispatched for a transportation service. A zone may also for example be defined as a specific vehicle storage zone, a specific vehicle storage zone being a zone in which vehicles are being stored in a specific area when not completing a transportation service. A zone may also for example be defined according to the purpose of the zone, such as an industrial zone corresponding to an industrial area, a commercial zone, an education institution zone, a residential zone, a sporting event zone or a recreation area zone for example. A zone may be defined taking into account characteristics of inhabitant or characteristics of the community living in the zone. A zone may also be defined using dimensions other than geographical, such as a time dimension whereby the zone corresponds to a specific time range, whereby replenishing stations are available in the specific time range. When referring to a zone defined using dimensions other than geographical, the terminology "located" applies to the dimension considered, meaning the vehicle of interest is comprised in the zone of interest. Other dimensions for zone definition in addition to geographical or time bound, are characteristics of vehicles, such as, for example, seating capacity, whereby a seating capacity zone comprises one or more replenishing station in line with the seating capacity considered. In an example, a low seating capacity zone includes replenishing stations comprising energy dispensing devices a relatively low power. In an example, a low seating capacity zone includes replenishing stations comprising energy dispensing devices a relatively low power. A zone may be defined taking into account a combination of factors, for example a city center zone limited to peak hours and low sitting capacity, or a mountainous zone limited to weekend and vacation time and to all wheel drive vehicles.

A specific replenishing station is located in the zone of interest according to the invention. The replenishing station may provide energy of a given type or of various different types. Such replenishing stations may indeed be configured to replenish a broad variety of vehicles. Replenishing stations may be located in the vicinity of a transportation hub such as a railway, subway, bus or coach station in order to offer a replenishing service close to a location where vehicles such as shared vehicles may be heavily used. The replenishing station may comprise a filling station comprising one or more fuel dispensers such as petrol, gasoline, diesel, compressed natural gas, liquid hydrogen, kerosene, alcohol fuel, biofuels, or other types of fuel. The replenishing station may comprise an electricity dispenser, for example an electricity dispenser having a capacity of any one of about 0.1, 1.5, 6, 7, 9, 12, 20, 400 or more kW. The replenishing station may comprise one or more charging levels, and it may serve very low power charging levels, for example a 70 W power charging level for a vehicle such as a scooter. Charging levels below 100 W may indeed be available at one or more electricity dispensers. An example of a charging level is a Level 1 charging level. A Level 1 charging level may comprise a domestic socket, for example a single phase or three phase socket, for example 120V, 240V or 360V, for example for overnight charging of batteries, for example offering a power of about 1 or 2 kW. An example of charging level is Level 2, for example offering a power of more than 5 kW and up to about 20 kW. A Level 2 charging level may comprise a dedicated energy dispensing device different from a domestic socket. Another example is Level 3 charging level, or DC (direct current) Fast charging offering for example of the order of between 50 and 120 kW. The replenishing station may comprise a plurality of energy dispensers, the plurality of energy dispensers comprising energy dispensers having different power ratings or offering different power levels in order to provide for replenishing different vehicle types or for replenishing using different replenishing times. Such different power levels may be available from one same energy dispensing device which may virtually switch from a power level to another in order to adapt to certain conditions. The replenishing station may comprise a plurality of dispensers or energy providing devices. The replenishing station may comprise a plurality of fuel dispensers and a plurality of electricity dispensers in a same replenishing station. The replenishing station may comprise a plurality of similar or equal electricity dispensers. The replenishing station may comprise energy providing devices, or dispensers, of different ratings. The replenishing station may be a mobile replenishing station, whereby the replenishing station may be configured to change location, for example by being mounted on wheels, or by being a flying replenishing station for vehicles such as drones. Example mobile replenishing station may permit replenishing the energy reserve of a vehicle which would not have a sufficient energy reserve level to reach a fixed replenishing station. A mobile replenishing station may be configured to replenish the energy reserve of a vehicle as the vehicle is in movement. An example mobile replenishing station may be directed towards a certain point or meeting point to replenish one vehicle or a plurality of vehicles at such meeting point. A group of autonomous vehicles may be combined and transported as a group towards a replenishing station, for example using a freight or public transportation vehicle, in order to reduce an overall energy consumption. A replenishing station may comprise one or more swappable batteries. Swappable batteries would for example permit replenishing electrical energy in significantly less time than by using an electrical plug to recharge an electrical battery, thereby significantly reducing the time during which a vehicle may have to remain stopped during an electrical charge or replenishment. A vehicle of interest according to this invention may be configured to operate as a replenishing station or replenishing vehicle, for example when such replenishing vehicle is connected to a replenishing station being a fixed replenishing station, for example if no dispensers are currently available at such fixed replenishing station because such dispensers are already occupied by other vehicles. A plurality of vehicles of interest may be interconnected, in series or in parallel, permitting charging a plurality of vehicles of interest from a single energy dispensing device and perhaps charging each vehicle at a different power level. A replenishing station according to the invention may be configured to match a specific energy providing device to the vehicle of interest of the invention, for example by comprising a powered mechanical arm configured to get connected to the energy reserve of the vehicle of interest without direct intervention of a human. Such replenishing station configured to match a specific energy providing device to the vehicle of interest of the invention may also comprise one or more sensors sensing the presence of the vehicle of interest. Such replenishing station configured to match a specific energy providing device to the vehicle of interest may permit gaining time and effort when refiling the vehicle of interest.

According to the invention, a specific replenishing station is assigned for replenishing a vehicle of interest based on a set of statistical data, the set comprising for example a plurality of data points of one or more types. A statistical data set may for example comprise trip length data. Trip length data may for example be categorized in various trip length ranges. An analysis of trip length data may permit predicting a probability that a future trip may have a certain length or fall within a predetermined length range. Statistical data may for example comprise trip frequency data. Trip frequency data may for example be categorized in trip frequencies falling or comprised within a specific time range, such as trip frequency at a certain hour of a day, or at a certain day of a week. An analysis of trip frequency may permit predicting a likelihood that a vehicle would be used for a trip at a certain time or on a certain day. Statistical data may for example comprise load. Load data may be categorized in various increasing load, volume or weight ranges. An analysis of load data may permit predicting an upcoming load for a vehicle. Statistical data may for example comprise speed. Speed data may be categorized in various speed ranges. An analysis of speed data may permit predicting an upcoming speed for an upcoming trip of a vehicle. Each of such example statistical data may contribute to evaluating and planning a timing and quantity of replenishment for replenishing an energy reserve of a vehicle. Statistical data according to examples of this invention comprises data having an impact on the use of an energy reserve of a vehicle. While some types of statistical data are listed here, other types of statistical data may be considered which would have an impact on the consumption of energy of a vehicle. Other such statistical data includes for example a gradient in height during a trip, maximum speed reached during a trip, ambient heat during a trip, road wetness during a trip, wind direction, rate of acceleration changes, air conditioning use, use of heating, use of lighting or frequency of stops. Statistical data may be collected over time by the same vehicles as the vehicles which replenish their energy reserve according to the method of the invention, in which case the vehicle of interest would emit data towards a computer system, the computer system receiving such data and including it to the statistical data on which the replenishing of the same vehicle of interest is based. Statistical data according to this invention may also comprise data related to user requests of users of a shared vehicle application for example.

The set of statistical data according to the invention may include one or more of such data types. In addition to comprising one or more of such data types, such statistical data may be based on real data collected over time, or may for example comprise simulated data, in lieu of or in addition to real data. The statistical data according to the invention may be classified for example by time, zone or vehicle type. This would for example permit evaluating or planning energy consumption or requirements for a given vehicle in a given area or zone, at a given hour or day. Some vehicle types may for example be used for longer trips and with a heavier load during weekends. Other vehicle types may be used for shorter and more frequent trips at peak hours during weekdays. Certain vehicles may be used more frequently in adverse weather conditions. Some vehicle types may be used more frequently in mountainous regions, or for example on roads covered with ice and snow.

The set of statistical data includes data which may for example represent one or a combination of a trip length, trip duration, trip frequency, vehicle characteristic, vehicle energy reserve level, distance between a location of a vehicle, replenishing station characteristic or type, or replenishing station energetic availability.

According to the invention, a specific replenishing station is assigned for replenishing the vehicle of interest based on a set of statistical data. Basing the assignment on a set of statistical data may for example comprise assigning a specific replenishing station located close to the vehicle if the set of statistical data supports that the vehicle is highly likely to be used and has a low energy reserve. Basing the assignment on a set of statistical data may for example comprise assigning a specific replenishing station located far from the vehicle if the set of statistical data supports that the vehicle is not likely to be used and if other relatively closer replenishing station should remain available for assignment to vehicles more likely to be used at this time. The specific replenishing station may thereby be assigned for replenishing the vehicle of interest based on a distance between a location of the vehicle of interest and the specific replenishing station. The invention may indeed foment an efficient use of replenishing stations which may permit relying on a lower number of replenishing stations while satisfying the needs of a relatively higher number of vehicles and vehicle users. The invention thereby may have a significant impact on city planning and traffic levels, for example. The invention may for example permit ensuring or enforcing replenishing station availability for a vehicle having a vehicle type of medical emergency vehicle. The invention may also enable detecting an excess or a lack of some types of replenishing stations. The invention may also enable replenishing vehicles with energy at times during which the statistical data set evidences a reduced use of such vehicles, so that the vehicles may not have to stop for charging or replenishment during use. In some examples, replenishment during periods of reduced use takes place for autonomous vehicles.

In another example, basing the assignment on a set of statistical data may for example comprise assigning a specific replenishing station based on the power level or energy type available at a replenishing station. The specific replenishing station may be assigned for replenishing the vehicle of interest based on an energetic availability of a plurality of replenishing stations located in the zone of interest. For example, if the vehicle of interest is a relatively light vehicle such as a scooter, tricycle or bicycle having a relatively reduced autonomy, the specific replenishing station may be a replenishing station comprising low power energy providing devices compared to other replenishing stations which have higher power energy providing devices and should for example remain available for heavier types of vehicles. In the specific case of electrical energy, electrical energy may be based on an available power and on an available charging time, whereby the product of such available charging time and available power leads to an electrical energy to be provided for replenishment. In another example, a relatively heavier vehicle may be assigned to a specific replenishing station comprising a high power energy providing device in lieu of other possibly closer replenishing stations which do not comprise such a high power energy providing device and which would otherwise remain occupied by such a relatively heavier vehicle for an excessive amount of time, thereby possibly impacting other vehicles.

FIG. 1 illustrates a method for replenishing a vehicle of interest 100. In this example, vehicle of interest 100 is a connected, shared and all electric scooter comprising a scooter controller (not illustrated) and a scooter energy reserve in the form of a swappable battery 200. The vehicle of interest is located in a zone of interest 300, in this case a city center area comprising streets (not illustrated). The method comprises emitting 400, from a computer system 500, and towards the vehicle controller of the vehicle of interest 100, instructions to direct the vehicle of interest. Note that while the computer system is illustrated as being outside of the zone of interest 300, the computer system 500 may also be placed within the zone of interest 300, a connection between the computer system 500 and the vehicle controller taking place for example by radio waves, or by a data network, for example through an internet public, private or hybrid cloud. The computer system 500 may be connected to the internet. The computer system 500 may be operating from or through a public or private cloud. The instructions are to direct the vehicle of interest 100 towards a specific replenishing station 600, in this case a replenishing station 600 comprising swappable batteries, such swappable batteries comprised at the specific replenishing station 600 being in this example fully charged. The replenishing station 600 is assigned for replenishing the vehicle of interest 100 based on a set of statistical data, which in this case is comprised in the computer system 500. In this example, the statistical data indicates that the scooter 100 pertains to a type of vehicles which is likely to be used within the next hour, for example a peak hour. The vehicle 100 is in this example directed towards the replenishing station 600 due to the upcoming peak hour as per the statistical data set, and based on the fact that its energy reserve 200 has a level 201 which is relatively low as illustrated by the position of arrow 250, and by the relative black to white filling area of energy reserve 200, black representing the remaining energy.

Figure 2A:
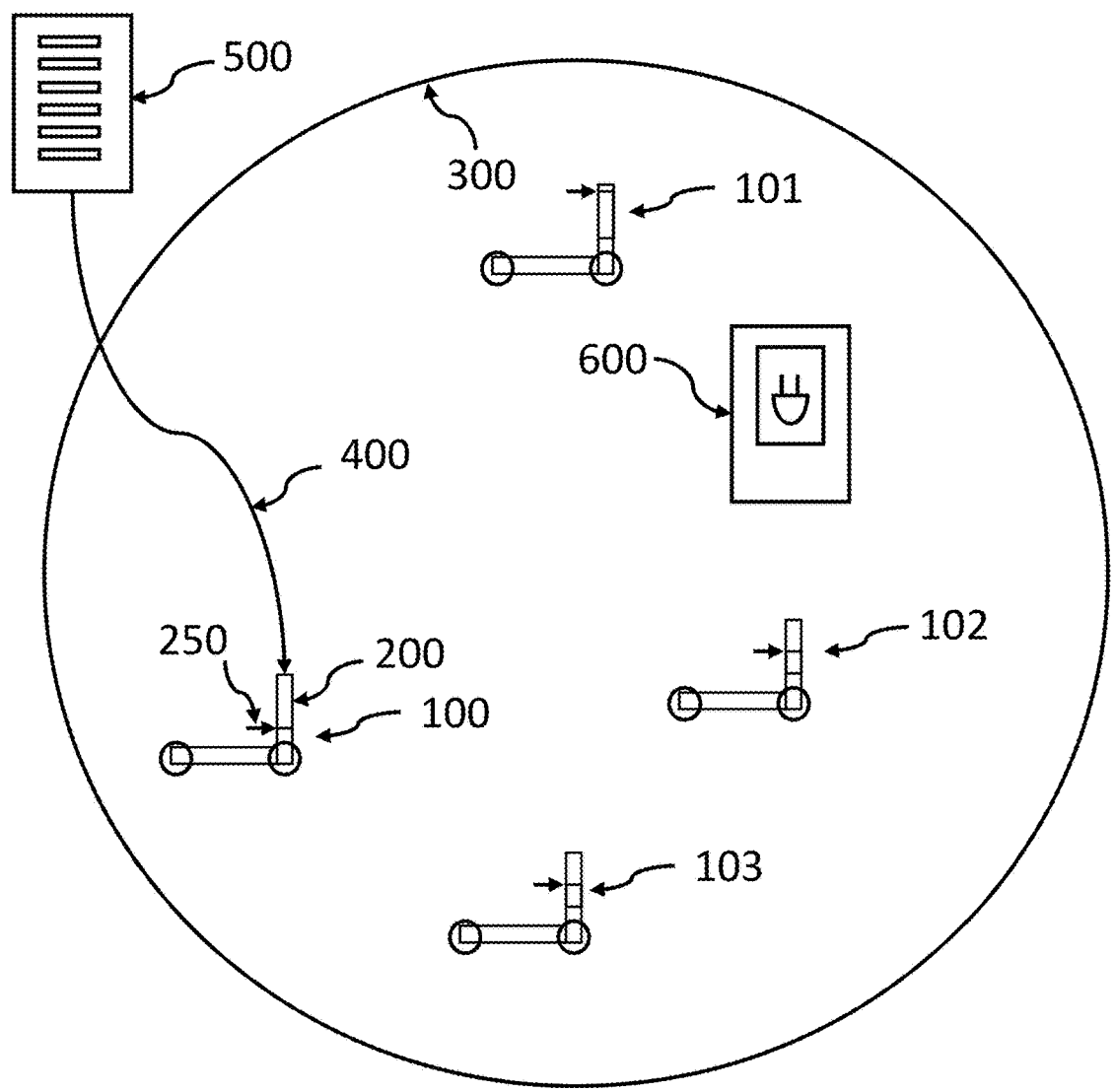
FIG. 2a is a diagram of another example zone of interest.
Figure 2B:
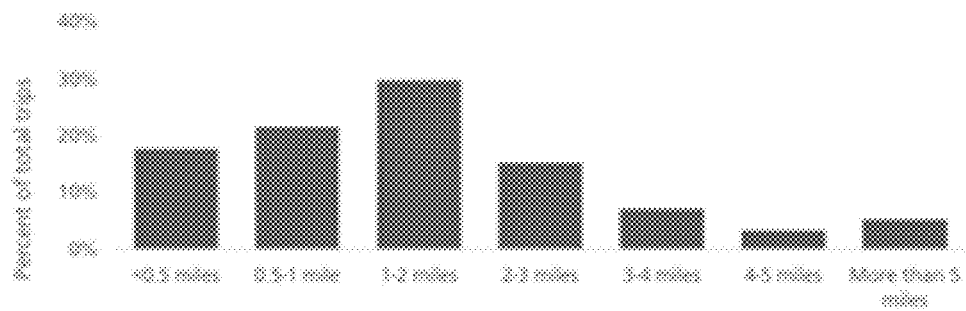

FIG. 2a illustrates another example of the method of the invention, using the same reference numeral as for FIG. 1 for the same elements, whereby a plurality of vehicles 100 to 103 are considered. Each of vehicles 101, 102 and 103 are in this example of the same type as the vehicle 100 of FIG. 1. In this example, the specific replenishing station 600 is assigned for replenishing the vehicle of interest 100 based on levels of energy reserve of a plurality of vehicles. In this example, the level of energy reserve of vehicle 101 is almost complete, the level of energy reserve of vehicle 100 is low, and the level of energy reserve of both vehicles 102 and 103 is medium. In the example of FIG. 2a, the set of statistical data is represented in FIG. 2b, where the set of statistical data is in the form of a distribution, the distribution counting a number of data point falling into each one of a plurality of categories. In this example, such a distribution counts, as a percentage, historical trip length data by distributing the data set into trip length categories in miles (a mile representing 1,609.344 meters). Such a distribution may for example be analyzed by the computer system 500. According to such an analysis, less than 25% of the vehicles are required to cover trips of more than 3 miles. In other words, in the context of shared vehicles as per this example, it is sufficient that 25% of a fleet have their energy reserve charged to a level permitting to travel for more than 3 miles. If a user of a vehicle sharing platform using vehicles 100 to 103 were to request one of such vehicles for a trip, there is 1 possibility out of 4 that such trip be a trip of a length of more than 3 miles. In this example, a trip length of more than 3 miles would require an almost full energy reserve. Such almost full energy reserve is available through vehicle 101, which represents 25% of the fleet formed by vehicles 100 to 103. There is thereby no requirement to compete for replenishment at replenishing station 600, and vehicle 100 may be assigned to being replenished at the specific replenishing station 600 in order to get replenished in energy for example up to a medium level of the energy reserve. In this example, the method of the invention comprises defining vehicle proportions based on the set of statistical data, the vehicle proportions comprising at least a longer trip proportion, in this case more than 3 miles, and a shorter trip proportion, in this case less than 3 miles, whereby the vehicle of interest is related to a vehicle proportion, in this case vehicle 101 being related to the proportion of a fleet which may handle trips of more than 3 miles, in accordance with a level of energy reserve of the vehicle of interest, in this example, an almost full energy reserve, whereby a higher level of energy reserve relates to a longer trip proportion. The other 3 vehicles 100, 102 and 103 may be comprised in a vehicle proportion of vehicles handling trips of less than 3 miles, representing about 75% of both the total number of vehicles, and the total number of trips as per the statistical data. In this manner, the method according to this example of the invention permits fulfilling user requests without excessive energy replenishment, without excessive use of a replenishing station, or without an excessive total number of replenishing stations or vehicles of interest. The invention may indeed permit using a relatively lower number of vehicles for a given transportation service.

Figure 3A:
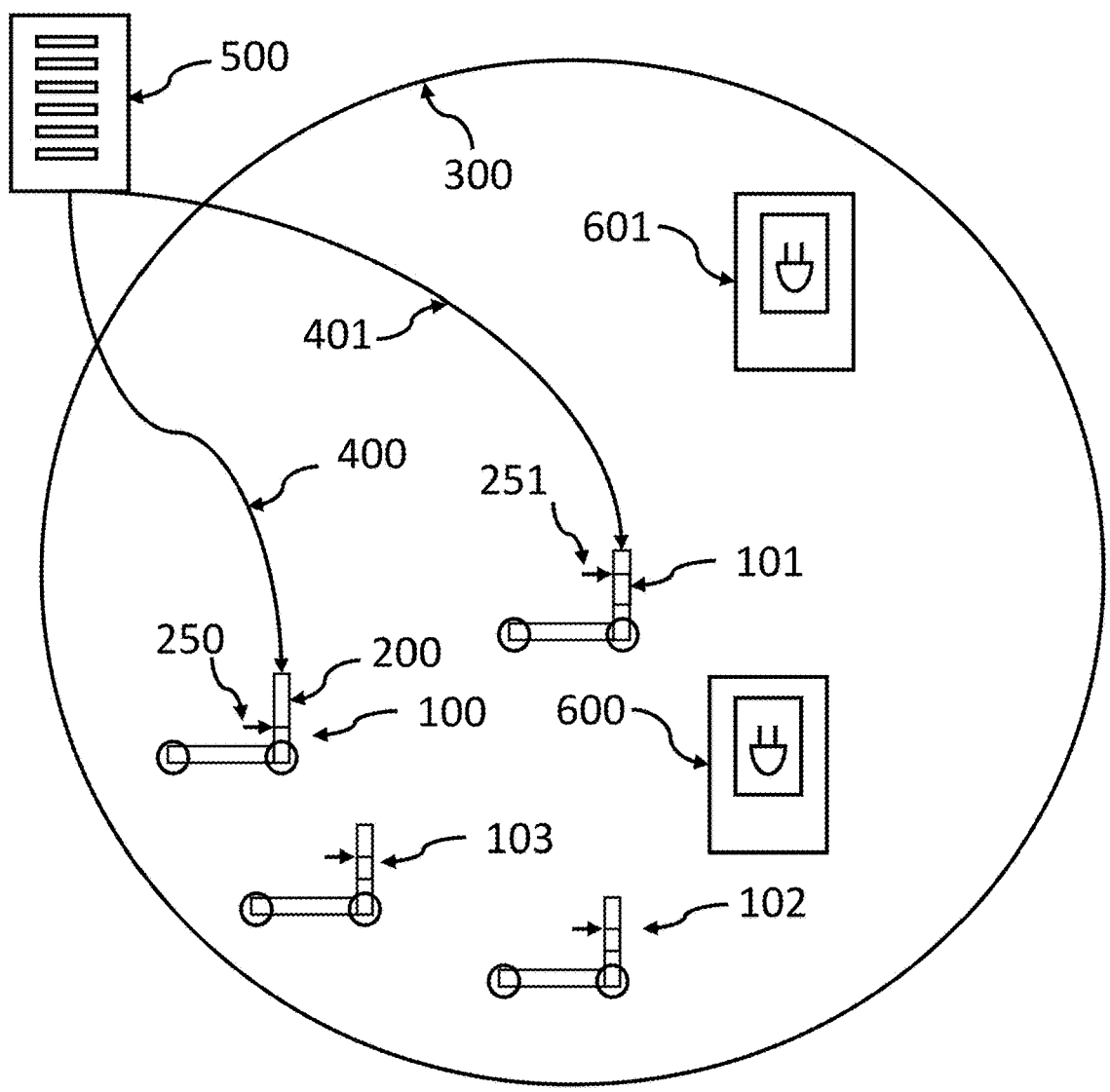
FIG. 3a is a diagram of a further example zone of interest.

FIG. 3a illustrates another example according to the invention, using the same reference numeral as for FIG. 1 or 2a. In the example of FIG. 3a, the specific replenishing station is assigned for replenishing the vehicle of interest based on an energetic availability of a plurality of replenishing stations located in the zone of interest, the plurality of replenishing stations comprising both replenishing station 600 and replenishing station 601.

Figure 3B:
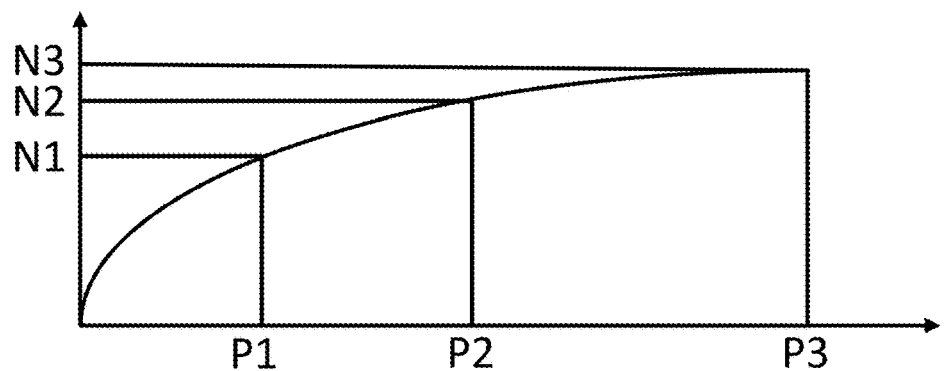

In this example illustrated in FIG. 3*a*, the statistical data set is in the form of a cumulative density function illustrated in FIG. 3*b*. This cumulative density function represents, along the horizontal axis, trip length such as long trip length P3, medium trip length P2 and short trip length P1. This cumulative density function represents, along the vertical axis, the percentage of trips at or below the corresponding trip length. In this example, N3% of the trips have a length of P3 or less. N2% of the trips have a length of P2 or less. N1% of the trips have a length of P1 or less. A cumulative density function may have a number of different shapes, but is a growing function by nature. In this example, the cumulative density function corresponds to a data set which does not have a Gaussian distribution, but a distribution similar to the distribution illustrated in FIG. 2*a*, whereby most trips are shorter trips, longer trips having a relatively long tail. In some other examples, the cumulative density function may have an S shape, particularly if the data set represented has a Gaussian distribution. In the context of trip length data for shared vehicles, a cumulative distribution function may be approximated by a probability density function being a power function of the trip length variable x and of its reflection (1-x) such as the following equation, where α is about 2, and β has a value of between 2 and 5:

$$f(x;\alpha,\beta) = \text{constant} \cdot x^{\alpha-1}(1-x)^{\beta-1}$$

In an example, α is about 2, and β is about 4.

In this example of FIG. 3*a-b*, the method according to the invention may for example be applied to simultaneously to both vehicles 100 and 101. In some examples, the method of the invention comprises replenishing an energy reserve of a plurality of vehicles of interest, whereby the replenishing takes place at the same time during at least part of a replenishing time. Because the method comprises assigning the replenishing station based on the set of statistical data, the cumulative distribution function will be taken into account. More specifically, the proportion of vehicles which should have an energy reserve level permitting trips of more than P2 is relatively limited, specifically N3 minus N2. If N3 is for example 99%, and N2 is for example 80%, only about 19% of the vehicles should have a full or almost full energy reserve. In the context of shared vehicles, this example implies that about 20% of the vehicles should have such a high level of energy reserve. In this case however, none of the vehicles 100 to 103 have such an energy reserve level (in particular, vehicle 101 has in example 3*a* an energy reserve level lower than the energy reserve level it had in example 2*a*, as illustrated by the position of arrow 251).

In this example as illustrated in FIG. 3*a-b*, the set of statistical data comprises data related to a total number of trips such that a high trip length portion of the total number of trips exceeds a high trip length threshold such as P2. In this example, the set of statistical data comprises data related to a total number of trips such that a low trip length portion of the total number of trips is below a low trip length threshold such as P1. In this case, based on the statistical data set, the method may rely on statistical data to enforce vehicle proportions in line with the cumulative distribution function, such that the energy reserve of up to N1% of the vehicles may be sufficient when at a medium level of the energy reserve level, due to the fact that N1% of the vehicles will statistically be assigned to trips having a length of P1 or less. In addition to this, about N2 minus N1 percent of the vehicles should be available for trips having a trip length of between P1 and P2, and therefore having an energy reserve level of more than medium, for example about ¾ or three quarters of the full capacity of the energy reserve. Finally, only a small proportion, namely N3 minus N2 percent of the vehicles should be maintained with an energy reserve level which would be full or almost full in order to be able to provide for transportation for trips having a length of between P2 and P3. Enforcing such vehicle proportions based on the statistical data set will reduce the risk that a user of shared vehicles would have to interrupt a trip in order to replenish the energy reserve of the vehicle. Such user of such shared vehicles would enter its request for a specific trip length, for example in a mobile phone application, and be assigned a vehicle having an energy reserve level matching or exceeding the energy reserve level required to provide the requested service, taking into account the requested trip length. In this example, the vehicles 100 to 103 are autonomous vehicles which may autonomously travel towards an assigned specific replenishing station. In order to function based on the statistical data set, the method of the invention will for example aim at ensuring that at least about N3–N2% (or about 19%) of the vehicles are fully or almost fully charged, for example by assigning to vehicle 101 the replenishing station closest to vehicle 101, namely replenishing station 600, through instruction 401. As a consequence, if replenishing stations would be replenishing a single vehicle at a time, vehicle 100 would be assigned replenishing station 601 through instruction 400, such specific replenishing station 601 being further away than replenishing station 600. While leading to facilitating replenishing of the most charged vehicle, and negatively impacting the replenishing of the less charged vehicle, the method of the invention will in this example be making the most efficient use of the vehicle fleet formed by vehicles 100-103 by reducing in this manner the risk that a user be impacted when requesting a longer trip while using the replenishing stations efficiently.

Figure 4:
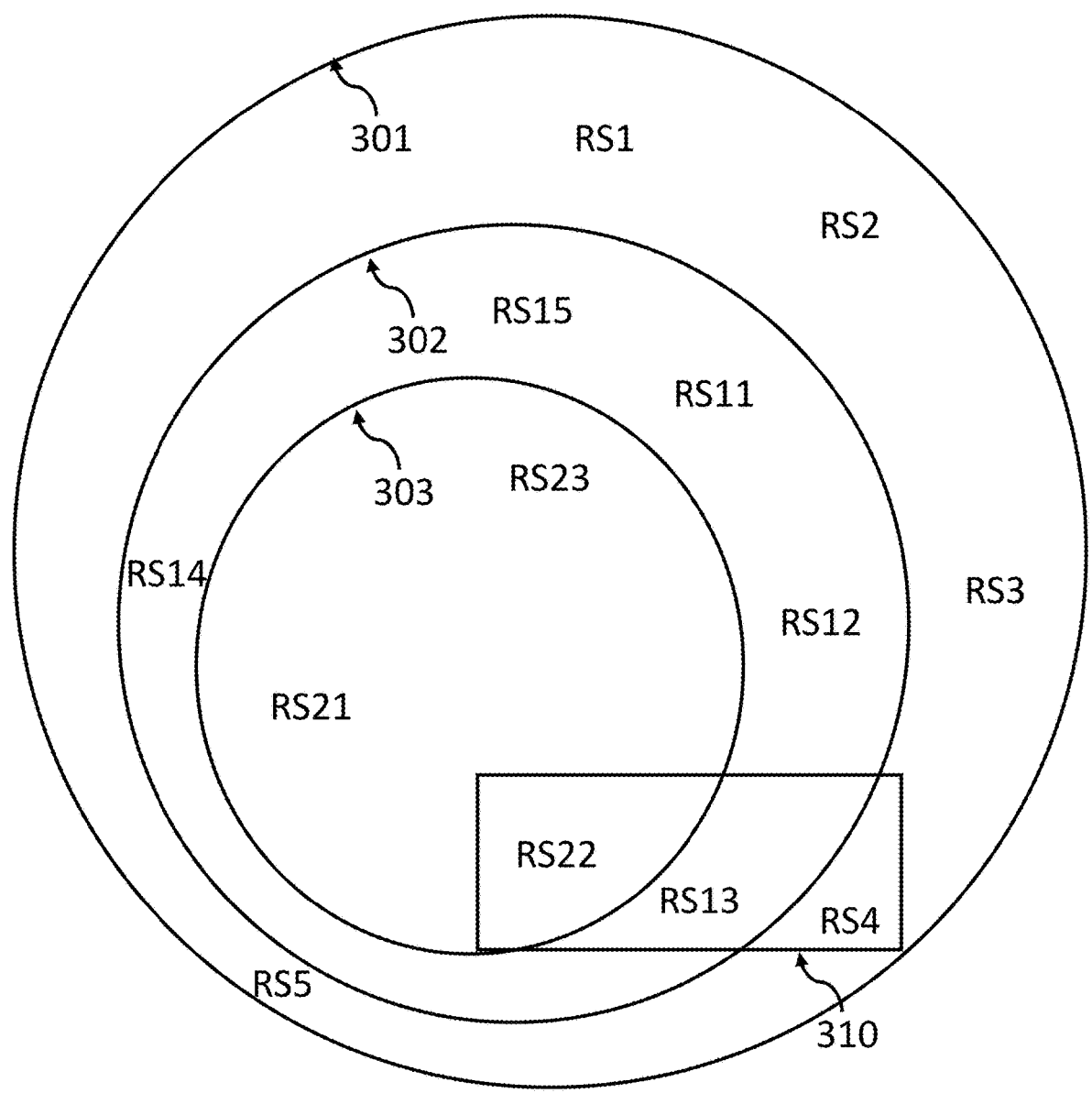
FIG. 4 is a diagram of yet another example zone of interest.

Another example of the method of the invention is illustrated in FIG. 4. In FIG. 4, only a number of zones of interest and replenishing stations are represented in order to ease readability.

Zone of interest 303 of FIG. 4 is a downtown area or city center zone of interest. Zone 302 of FIG. 4 is a close suburb zone of interest. Zone 303 is a far suburb zone of interest. Both zones 301 and 302 are roughly annular zones, zone 301 excluding both zones 302 and 303, zone 302 being limited towards the inside by zone 303, and towards the outside by zone 301. While zones 301, 302 and 303 are represented as circular or annular, such zone may take various different shapes adapted to city mapping for example. Such zones may also be defined as variable over time to match statistical driving or travelling behavior, for example by defining zones matching a weekday peak hour behavior, or zones adapted to a day of mass departure for vacation. An additional zone 310 is represented, which may be used by the method of the invention in addition to or instead of the zones 301, 302 and 303, and may be defined for example by a regular grid pattern, and may intersect or include other zones. In this case, zone 310 is included to permit taking into account into one zone 310 the proximity of replenishing stations RS22, RS13 and RS4 which otherwise are comprised into different zones. The method may indeed apply different zone model over a same area, at different times or at the same time. In this example, zone 301-303 are each defined related the zone to a relatively homogeneous vehicle usage, i.e. relatively shorter trips, higher trip frequency and more reduced presence of replenishing stations when closer to the city center.

The area represented in FIG. 4 comprises a network of replenishing stations RS, each being located into one or more zones of interest. The replenishing stations may for example be as follows:

TABLE 1

| Replenishing Station | Zone of interest | Type of energy available | Power levels available | Number of energy providing devices | Availability |
| --- | --- | --- | --- | --- | --- |
| RS1 | 301 | H2 | High | 4 | High |
| RS2 | 301 | Electrical | Low | 8 | Medium |
| RS3 | 301 | H2 and Electrical | High and Low | 5 | High |
| RS4 | 301, 310 | Petrol and Compressed Natural Gas | High | 3 | High |
| RS5 | 301 | Petrol, H2 and Electrical | Medium | 5 | Medium |
| RS11 | 302 | H2 | Medium | 10 | Low |
| RS12 | 302 | Electrical | Low | 12 | Low |
| RS13 | 302, 3010 | H2 and Electrical | Medium and Low | 15 | Medium |
| RS14 | 302 | Petrol | High | 14 | Medium |
| RS15 | 302 | Petrol and Compressed Air | Low and High | 10 | High |
| RS21 | 303 | Electrical | Low and medium | 25 | Medium |
| RS22 | 303, 310 | Electrical | Medium and high | 30 | Low |
| RS23 | 303 | Electrical | Low | 40 | Low |

While some replenishing stations only offer one type of energy, some replenishing stations comprise various energy types. The replenishing stations comprise a plurality of energy providing devices, each of which being associated to an energy type, to a power level and/or to a replenishment time or average replenishment time, whereby the replenishment time corresponds to a time during which a vehicle is connected to an energy providing device. Note that some higher power energy providing devices may replenish energy in less time than some lower power energy providing devices. Each replenishing station is associated to an availability or energetic availability which relates to a probability that such a replenishing station would have one or more energy devices available for replenishing a vehicle with energy at a given time. Such availability may be specific to energy providing devices. All information such as location of the replenishing station, energy type, power level of each energy providing device and availability profile of energy providing devices may be communicated to the computer system according to the invention.

The zones represented on FIG. 4 also include a network of roads and streets which is not represented and interconnects the replenishing stations.

The area of FIG. 4 is also comprising numerous vehicles to which instructions according to the invention may be emitted by the method of the invention. Such vehicles are not represented. For each vehicle, the method according to the invention may be operated such that the vehicle of interest is one of a plurality of vehicles located in the zone of interest and whereby each vehicle of the plurality of vehicles is subjected to the emitting step of the method as a vehicle of interest, the emitting step being the step of emitting, from a computer system and towards a vehicle controller of the vehicle of interest or towards a mobile terminal of a user of the vehicle of interest, instructions to direct the vehicle of interest towards a specific replenishing station located in the zone of interest, whereby the specific replenishing station is assigned for replenishing the vehicle of interest based on a set of statistical data. Such numerous vehicles form one fleet, a plurality of fleets, or a plurality of sub fleets. Each fleet or sub fleet may comprise a plurality of vehicles such that the vehicles of the plurality of vehicles share some common characteristics, whereby the characteristics may comprise one or more of an energy type, a power level or a mechanical structure. In some examples, the plurality of vehicles forming a fleet or sub fleet comprises several vehicle groups, each group comprising vehicles sharing common characteristics, whereby at least one of the common characteristics differs from one vehicle group to another vehicle group, and whereby each group corresponds to a respective set of statistical data in the zone of interest. An example may be an electrical vehicle fleet, comprising family cars in one group, and scooters in another group. Each of such vehicles may be connected either directly to a computer system (not illustrated) by a vehicle controller, or indirectly, for example through a mobile device of a driver or user (which may not be the driver). The vehicles may be of various different types, including for example shared all electrical autonomous vehicles, private petrol and electrical hybrid vehicles, taxi vehicles powered by hydrogen (H2) or compressed natural gas, shared vehicles powered by petrol. Numerous other types of vehicles may be comprised, each having an energy reserve according to examples of the invention, each being located into one of more zones of interest according to examples of the invention.

The example illustrated in FIG. 4 is associated with a statistical data set. The statistical data set may comprise trip related data such as trip length and trip frequency, and may provide such data in function of specific days, time, vehicle type or weather for example. Such statistical data may be processed, for example using a Kalman filter or other estimation processes to generate one or more estimates of energy reserve level profiles of one or more fleets. Such energy reserve level profiles may be general and apply to all vehicles in one or more zone of interest, or apply to a specific vehicle type within the zone. Such energy reserve level profiles may be specific to a given day or time. Such an estimate may for example apply to H2 powered vehicles located in zone 302, or to electrically powered vehicles or electrical vehicles located in zone 303, or to a combination of such vehicles located in a macro zone defined as comprising both zones 302 and 303. The method of the invention may be operated in a plurality of zones of interest, whereby each zone of interest is associated to a respective set of statistical data in the zone of interest. Such statistical data set or sets may be updated over time, such that the method according to the invention comprises regularly receiving updated versions of the set of statistical data, thereby allowing, in some examples, data to be as precise as possible and as close to reality as possible.

The method may in the example of FIG. 4 compare the estimated energy reserve level profiles generated by analysis of the statistical data sets to define vehicle proportions using machine learning processes, such as random forest, neuro networks or support vector machine processes. The method may then comprise, for each vehicle of interest, assigning the specific replenishing station as one of a plurality of replenishing stations located in the zone of interest, whereby each replenishing station of the plurality of replenishing stations has transmitted its energetic availability to the remote computer system and whereby each replenishing station of the plurality of replenishing stations is comprised in one of a plurality of energetic availability categories. For a specific vehicle of interest in this example, the plurality of energetic availability categories comprises a lower energetic availability category and a higher energetic availability category, whereby the vehicle of interest is for example assigned a specific replenishing station comprised in the higher energetic availability category if the vehicle of interest is related to a longer trip proportion. This specific assignment permits ensuring that a user requiring a vehicle for a long trip will have this vehicle available, and available with the corresponding high level energy reserve. For another vehicle of interest in this example, the plurality of energetic availability categories comprises a lower energetic availability category and a higher energetic availability category, whereby the specific replenishing station is assigned for replenishing the vehicle of interest based on levels of energy reserve of a plurality of vehicles. In some examples, the higher and lower energetic availability categories are energetic availability categories selected from a total number of energetic availability categories, the total number of energetic availability categories being of more than 2. In an example, the total number of energetic availability categories is T, the T energetic availability categories ranging from lower to higher energetic availability. In this example, T is a natural integer. T may be 2, or more than 2. In some examples, T is any one of 2, 3, 4, 5, 6, 10, 12, 15 or 20. Taking into account the energy reserve of a plurality of vehicles for the replenishment assignment permits balancing the profile of an entire fleet or part of a fleet, attempting to have the real situation match as closely as possible an estimate of energy reserve levels based on the statistical data set. If for example vehicles pertaining to a vehicle proportion is found to have effective real energy reserve levels or an average energy reserve level significantly differing from the estimated energy reserve level for this proportion, priority may be given to replenishing the vehicles pertaining to this proportion in relation to the amount of differing. In particular, if a specific vehicle has for example a very low or a very high energy reserve level, the specific replenishing station is assigned for replenishing the vehicle of interest based on a level of the energy reserve. In case of a very low energy reserve level, the method may for example assign a replenishing station located very closely to the vehicle of interest having such very low energy level reserve, even if the assigned specific replenishing station has a very low availability. In fact, in such cases, the method may be concurrently applied to other vehicles, assigning other vehicles to other more remote replenishing stations, to ensure that the vehicle having the particularly low energy reserve level gets replenished. By concurrently, it is meant during a same time period of a duration corresponding for example to an average energy replenishment time. In an example, the specific replenishing station is assigned for replenishing the vehicle of interest based on one or both of a trip length of a requested transportation trip and a trip length to a starting point of the requested transportation trip, in particular if the vehicle of interest is a shared, connected and autonomous vehicle which pertains to a fleet accessed by users of a shared transportation application.

Figure 5A:
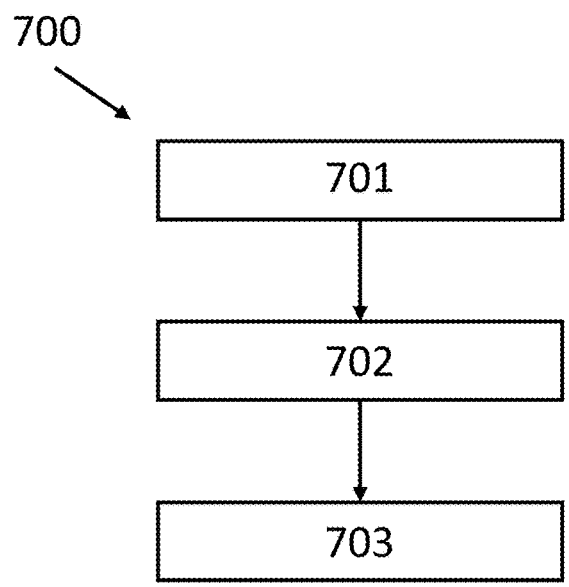
FIG. 5a is a diagram of an example method.

FIG. 5a illustrates a method 700 for replenishing an energy reserve of a vehicle of interest as discussed in any one of the examples hereby described, the vehicle of interest being located in a zone of interest as discussed in any one of the examples hereby described, the method comprising emitting, in a step 701, from a computer system and towards a vehicle controller of the vehicle of interest, instructions to direct, in a step 703, the vehicle of interest towards a specific replenishing station as per any of the examples hereby described, the specific replenishing station being located in the zone of interest, whereby the specific replenishing station is assigned, in a step 702, for replenishing the vehicle of interest based on a set of statistical data as per any of the examples hereby described.

Figure 5B:
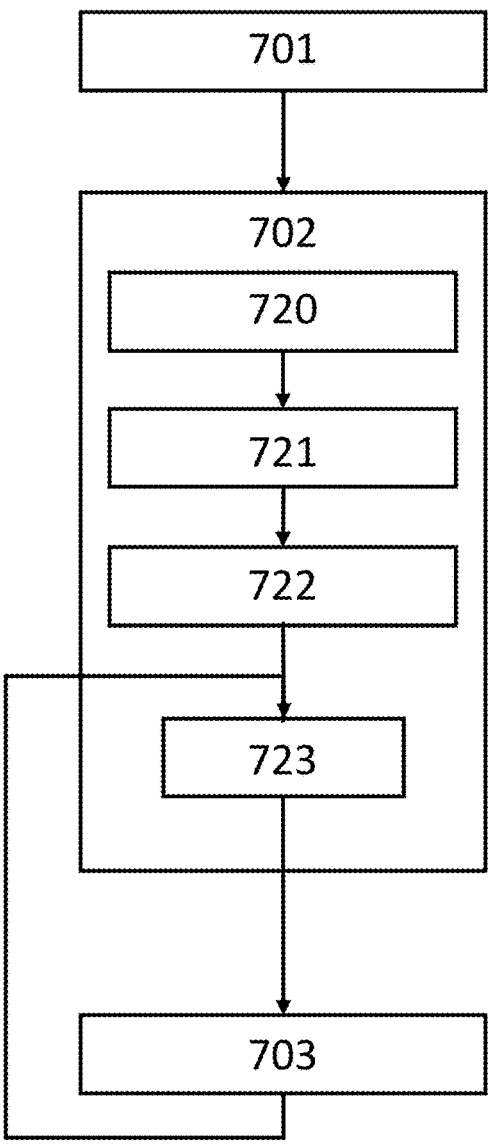
FIG. 5b is a diagram of another example method.

FIG. 5b illustrates another example method comprising steps of the method of FIG. 5a, whereby step 702 of FIG. 5a is divided into a number of sub steps. In step 720, a distribution of trip length forming a statistical data set is acquired in all of a plurality of zones of interest. In step 721, for a given zone of interest of the plurality of zones of interest, a number N of proportions of vehicles of interest are defined, such proportions of vehicles of interest ranking from a first proportion P1 corresponding to a number of vehicles assigned to shortest trips, up to a proportion PN corresponding to a number of vehicles assigned to the longest trips, whereby N is a natural integer having a value of at least 2. In step 722, available energy providing devices of replenishing stations are identified and ranked for each vehicle taking into account either one or both of amount of power at the available energy providing device and distance between a vehicle and a replenishing station. Such amount of power and distance components may be assigned a weight to define such a ranking, thereby providing a high rank to the closest and/or most powerful replenishing stations, and a low rank to the replenishing stations offering a lower power and being further away from a given vehicle. In step 723, starting by the proportion PN, the vehicle of interest which is both not fully charged and has the highest energy reserve level is routed to the closest and/or most powerful energy providing device. Step 723 is repeated until the proportion of vehicles comprised in the proportion PN corresponding to longest trips are at an appropriate energy reserve level. Step 723 is then applied to a proportion PN-1 to replenish the energy reserve of vehicles which will be assigned to trips having a length shorter than the vehicles assigned to PN, but longer than the vehicles assigned to PN-2, assuming that N has a value of 3 or more. Such iterative process will prioritize replenishing vehicles in step 703 at closer replenishing stations offering a higher power, in order to fulfill demand on longer trips as per the statistical data set. If, under real conditions, the demand on long trips happens to be lower than predicted, shorter trips may of course be handled by vehicles in principle replenished to be assigned to longer trips. In some examples, such a method is applied to shared autonomous vehicles which are not currently assigned to user, i.e. which are between trips required by users of a shared vehicle application. Such method may take into account, when ranking the replenishing stations, the trajectory of a return trip leading to enforcing a geographical repartition of the shared autonomous vehicles. In other words, if a geographical area is found to lack availability of shared autonomous vehicle compared to user requests, the method of the invention may aim at assigning a specific replenishing station in this geographical area, consistently with a return trip towards this area.

Figure 6:
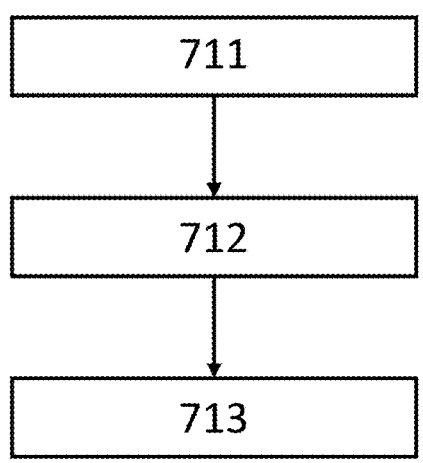
FIG. 6 is a diagram of yet another example method.

FIG. 6 illustrates a method 710 for replenishing an energy reserve of a vehicle of interest, as per any of the examples hereby described, located in a zone of interest as per any of the examples hereby described, the method comprising generating or receiving, in step 711, from a remote computer system, by a vehicle controller of the vehicle of interest, instructions to travel towards a specific replenishing station as per any of the examples hereby described and located in the zone of interest, whereby the specific replenishing station is assigned, in step 712, for replenishing the vehicle of interest based on a set of statistical data as per any of the examples hereby described, and, directing, in step 713, the vehicle of interest towards the specific replenishing station.

Figure 7:
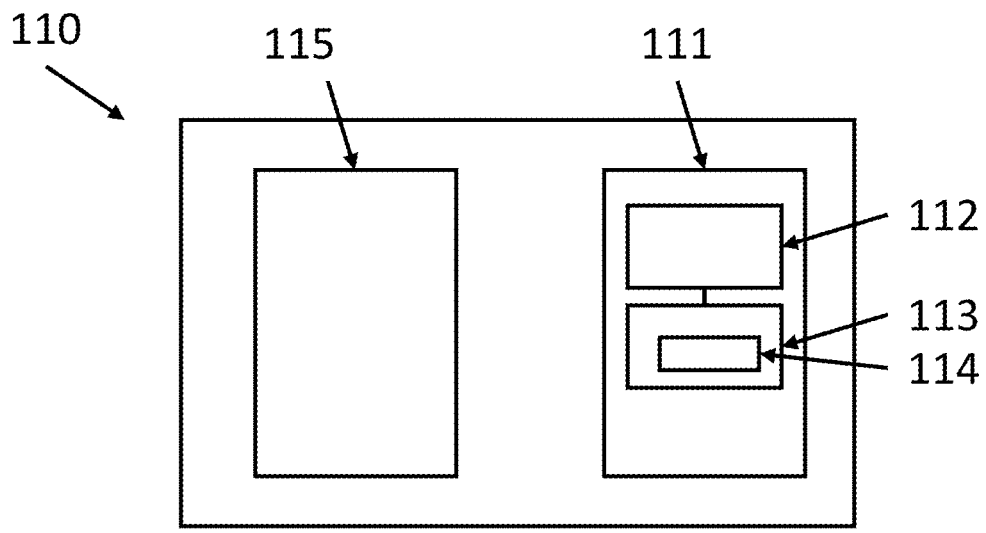
FIG. 7 is a diagram of an example vehicle.

FIG. 7 illustrates a vehicle of interest 110 as per any of the examples hereby described, the vehicle of interest 110 being located in a zone of interest, the vehicle of interest 110 comprising a vehicle controller 111, the vehicle controller comprising a vehicle processing unit 112 and a vehicle memory 113, the vehicle memory being 113 connected to the vehicle processing unit 112, the vehicle memory 113 comprising instructions 114 which, when executed by the vehicle processing unit 112, cause the vehicle of interest 110 to:

receive or generate instructions to travel towards a specific replenishing station located in the zone of interest, whereby the specific replenishing station is assigned for replenishing an energy reserve 115 of the vehicle of interest 110 based on a set of statistical data; and initiate movement of the vehicle 110 of interest towards the specific replenishing station.

FIG. 7 also illustrates a non-transitory machine-readable storage medium, such as, for example, vehicle memory 113, whereby the non-transitory machine-readable storage medium is encoded with instructions 114 executable by a processor such as vehicle processing unit 112, the machine-readable storage medium comprising instruction 114 to receive, from a remote computer system as per any of the examples hereby described, at a vehicle of interest as per any of the examples hereby described and located in a zone of interest, instructions 114 to travel towards a specific replenishing station as per any of the examples hereby described and located in the zone of interest, whereby the specific replenishing station is assigned for replenishing an energy reserve 115 of the vehicle of interest 110 with energy based on a set of statistical data as per any of the examples hereby described; and instructions 114 to direct the vehicle of interest 110 towards the specific replenishing station.

A machine readable storage according to the invention may be any electronic, magnetic, optical or other physical storage device that stores executable instructions. The machine readable storage may be, for example, Random Access Memory (RAM), an Electrically erasable Programmable Read Only Memory (EEPROM), a storage drive, and optical disk, and the like. As described hereby, the machine readable storage may be encoded with executable instructions according to the methods hereby described.

Storage or memory may include any electronic, magnetic, optical or other physical storage device that stores executable instructions as described hereby.

Figure 8:
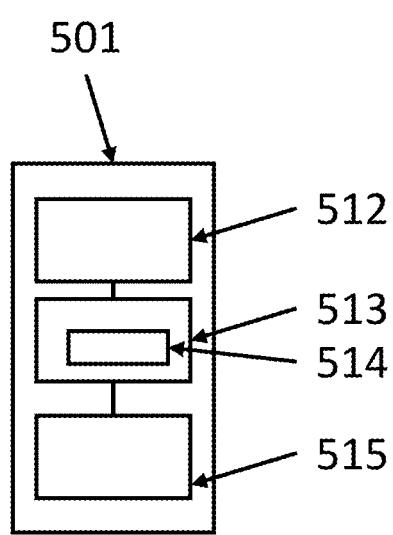
FIG. 8 is a diagram of an example computer system.

FIG. 8 illustrates a computer system 501 as per any of the examples hereby described comprising a processor 512, a storage unit 513, a networking unit 515 and an instruction set 514 to cooperate with the processor 512 and the storage unit 515 to emit, from the networking unit 515 and towards a vehicle controller of a vehicle of interest as per any of the examples hereby described located in a zone of interest as per any of the examples hereby described, instructions to direct the vehicle of interest towards a specific replenishing station as per any of the examples hereby described and located in the zone of interest, whereby the specific replenishing station is assigned for replenishing an energy reserve of the vehicle of interest based on a set of statistical data as per any of the examples hereby described.

FIG. 8 also illustrates a non-transitory machine-readable storage medium, such as, for example, storage unit 513, whereby the non-transitory machine-readable storage medium is encoded with instructions 514 executable by a processor such as processor 512, the machine-readable storage medium comprising instruction 514 to emit, from a networking unit such as networking unit 515 of computer system 501 and towards a vehicle controller of a vehicle of interest as per any of the examples hereby described and located in a zone of interest as per any of the examples hereby described, as well as instructions 514 to direct the vehicle of interest towards a specific replenishing station as per any of the examples hereby described and located in the zone of interest, whereby the specific replenishing station is assigned for replenishing an energy reserve of the vehicle of interest based on a set of statistical data as per any of the examples hereby described.

Figure 9:
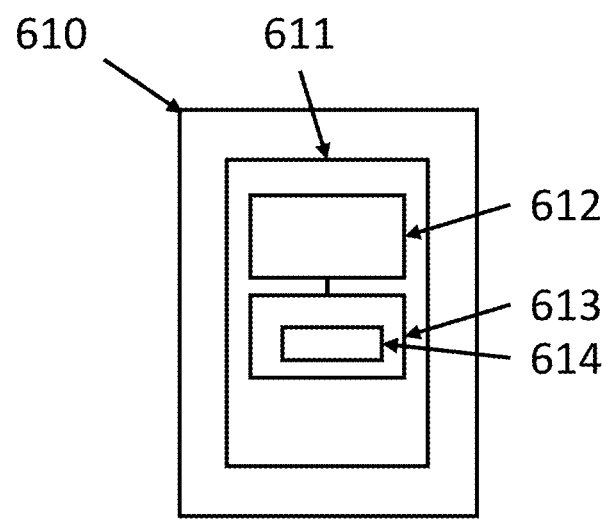
FIG. 9 is a diagram of an example replenishing station.

FIG. 9 illustrates a specific replenishing station 610 as per any of the examples hereby described, the specific replenishing station being located in a zone of interest as per any of the examples hereby described, the specific replenishing station 610 comprising a station controller 611, the station controller 611 comprising a station processing unit 612 and a station memory 613, the station memory 613 being connected to the station processing unit 612, the station memory 613 comprising instructions 614 which, when executed by the station processing unit 612, cause the specific replenishing station 610 to replenish an energy reserve of a vehicle of interest as per any of the examples hereby described and located in the zone of interest, based on a set of statistical data as per any of the examples hereby described.

The invention claimed is:

1. A method for replenishing an energy reserve of a vehicle of interest, the vehicle of interest being located in a zone of interest, the method comprising:

emitting, from a computer system and towards a vehicle controller of the vehicle of interest, instructions to direct the vehicle of interest towards a specific replenishing station located in the zone of interest, whereby the specific replenishing station is assigned for replenishing the vehicle of interest based on a set of statistical data defining a medium level of energy reserve, whereby the set of statistical data is in the form of a distribution or in the form of a cumulative density function, whereby the vehicle of interest is one of a plurality of vehicles located in the zone of interest, whereby the statistical data is collected over time from the plurality of vehicles, and whereby the method further comprises:

defining vehicle proportions based on the set of statistical data, the vehicle proportions comprising at least a longer trip proportion and a shorter trip proportion, whereby the vehicle of interest is related to a vehicle proportion in accordance with a level of energy reserve of the vehicle of interest, whereby a higher level of energy reserve relates to a longer trip proportion; and enforcing the vehicle proportions of the plurality of vehicles using the statistical data such that a limited proportion of vehicles is maintained with an energy level of more than the medium level.

2. The method in accordance with the method of claim 1 whereby the set of statistical data includes data representing one or a combination of a trip length, a trip duration, a trip frequency, a vehicle characteristic, a vehicle energy reserve level, a distance between a location of a vehicle and a replenishing station or a replenishing station energetic availability.

3. The method in accordance with the method of claim 1 whereby the specific replenishing station is assigned for replenishing the vehicle of interest based on a distance between a location of the vehicle of interest and the specific replenishing station.

4. The method in accordance with the method of claim 1 whereby the specific replenishing station is assigned for replenishing the vehicle of interest based on an energetic availability of a plurality of replenishing stations located in the zone of interest.

5. The method in accordance with the method of claim 1 whereby the specific replenishing station is assigned for replenishing the vehicle of interest based on levels of energy reserve of the plurality of vehicles.

6. The method in accordance with the method of claim 1 comprising:
regularly receiving updated versions of the set of statistical data;
defining the vehicle proportions using machine learning.

7. The method in accordance with the method of claim 1, whereby the specific replenishing station is one of a plurality of replenishing stations located in the zone of interest and whereby each replenishing station of the plurality of replenishing stations transmits an energetic availability to the remote computer system and whereby each replenishing station of the plurality of replenishing stations is comprised in one of a plurality of energetic availability categories.

8. The method in accordance with the method of claim 7, whereby the plurality of energetic availability categories comprises a lower energetic availability category and a higher energetic availability category, whereby the vehicle of interest is assigned a specific replenishing station comprised in the higher energetic availability category if the vehicle of interest is related to the longer trip proportion.

9. The method in accordance with the method of claim 7, whereby the plurality of energetic availability categories comprises a lower energetic availability category and a higher energetic availability category and whereby the specific replenishing station is assigned for replenishing the vehicle of interest based on levels of energy reserve of the plurality of vehicles.

10. The method in accordance with the method of claim 1 comprising:
operating the method of claim 1 in a plurality of zones of interest, whereby each zone of interest is associated to a respective set of statistical data in the zone of interest.

11. The method in accordance with the method of claim 10, whereby the plurality of zones of interest comprises zones having differing densities of population.

12. The method in accordance with the method of claim 1, whereby the set of statistical data comprises data related to a total number of trips such that a high trip length portion of the total number of trips exceeds a high trip length threshold.

13. The method in accordance with the method of claim 12, whereby the set of statistical data comprises data related to a total number of trips such that a low trip length portion of the total number of trips is below a low trip length threshold.

14. The method in accordance with the method of claim 1, whereby each vehicle of the plurality of vehicles is subjected to the emitting step as a vehicle of interest.

15. The method in accordance with the method of claim 14, whereby the vehicles of the plurality of vehicles share some common characteristics.

16. The method in accordance with the method of claim 15, whereby the characteristics comprise one or more of an energy type, a power level or a mechanical structure.

17. The method in accordance with the method of claim 14, whereby the plurality of vehicles comprises several vehicle groups, each group comprising vehicles sharing common characteristics, whereby at least one of the common characteristics differs from one vehicle group to another vehicle group, and whereby each group corresponds to a respective set of statistical data in the zone of interest.

18. A method for replenishing an energy reserve of a vehicle of interest located in a zone of interest, the method comprising:
generating or receiving from a remote computer system, by a vehicle controller of the vehicle of interest, instructions to travel towards a specific replenishing station located in the zone of interest, whereby the specific replenishing station is assigned for replenishing the vehicle of interest based on a set of statistical data defining a medium level of energy reserve; and
directing the vehicle of interest towards the specific replenishing station,
whereby the set of statistical data is in the form of a distribution or in the form of a cumulative density function, whereby the vehicle of interest is one of a plurality of vehicles located in the zone of interest, whereby the statistical data is collected over time from the plurality of vehicles, the method further comprising:
defining vehicle proportions based on the set of statistical data, the vehicle proportions comprising at least a longer trip proportion and a shorter trip proportion, whereby the vehicle of interest is related to a vehicle proportion in accordance with a level of energy reserve of the vehicle of interest, whereby a higher level of energy reserve relates to a longer trip proportion; and
enforcing the vehicle proportions of the plurality of vehicles using the statistical data such that a limited proportion of vehicles is maintained with an energy level of more than the medium level.

19. The method in accordance with the method of claim 18, whereby the specific replenishing station is assigned for replenishing the vehicle of interest based on a level of the energy reserve.

20. The method in accordance with the method of claim 18, whereby the specific replenishing station is assigned for replenishing the vehicle of interest based on one or both of a trip length of a requested transportation trip and a trip length to a starting point of the requested transportation trip.

21. A computer system comprising a processor, a storage unit, a networking unit and an instruction set to cooperate with the processor and the storage unit to:
emit, from the networking unit and towards a vehicle controller of a vehicle of interest located in a zone of interest, instructions to direct the vehicle of interest towards a specific replenishing station located in the zone of interest, whereby the specific replenishing station is assigned for replenishing an energy reserve of the vehicle of interest based on a set of statistical data defining a medium level of energy reserve, whereby the set of statistical data is in the form of a distribution or in the form of a cumulative density function, whereby the vehicle of interest is one of a plurality of vehicles located in the zone of interest, whereby the statistical data is collected over time from the plurality of vehicles;

define vehicle proportions based on the set of statistical data, the vehicle proportions comprising at least a longer trip proportion and a shorter trip proportion, whereby the vehicle of interest is related to a vehicle proportion in accordance with a level of energy reserve of the vehicle of interest, whereby a higher level of energy reserve relates to a longer trip proportion; and enforce the vehicle proportions of the plurality of vehicles using the statistical data such that a limited proportion of vehicles is maintained with an energy level of more than the medium level.

22. A specific replenishing station, the specific replenishing station being located in a zone of interest, the specific replenishing station comprising a station controller, the station controller comprising a station processing unit and a station memory, the station memory being connected to the station processing unit, the station memory comprising instructions which, when executed by the station processing unit, cause the specific replenishing station to:

replenish an energy reserve of a vehicle of interest located in the zone of interest based on a set of statistical data defining a medium level of energy reserve, whereby the set of statistical data is in the form of a distribution or in the form of a cumulative density function, whereby the vehicle of interest is one of a plurality of vehicles located in the zone of interest, whereby the statistical data is collected over time from the plurality of vehicles;

define vehicle proportions based on the set of statistical data, the vehicle proportions comprising at least a longer trip proportion and a shorter trip proportion, whereby the vehicle of interest is related to a vehicle proportion in accordance with a level of energy reserve of the vehicle of interest, whereby a higher level of energy reserve relates to a longer trip proportion; and enforce the vehicle proportions of the plurality of vehicles using the statistical data such that a limited proportion of vehicles is maintained with an energy level of more than the medium level.

23. The specific replenishing station in accordance with the specific replenishing station of claim 22, whereby the energy is an electrical energy.

24. The specific replenishing station in accordance with the specific replenishing station of claim 23, whereby the electrical energy is based on an available power and on an available charging time.

25. The specific replenishing station in accordance with the specific replenishing station of claim 23, whereby the specific replenishing station comprises swappable batteries.

26. The specific replenishing station in accordance with the specific replenishing station of claim 22, whereby the energy is in the form of hydrogen.

27. The specific replenishing station in accordance with the specific replenishing station of claim 22, whereby at least some of the replenishing station of the plurality of replenishing stations are mobile replenishing stations.

28. The specific replenishing station in accordance with the specific replenishing station of claim 22, whereby the specific replenishing station comprises a plurality of energy providing devices.

29. The replenishing station in accordance with the specific replenishing station of claim 28, whereby the energy providing devices comprise energy providing devices of different ratings.

30. The replenishing station in accordance with the specific replenishing station of claim 29, whereby the replenishing station energy is configured to match a specific energy providing device to the vehicle of interest.

31. The replenishing station in accordance with the specific replenishing station of claim 22, whereby the replenishing station is a replenishing vehicle.

32. A non-transitory machine-readable storage medium encoded with instructions executable by a processor, the machine-readable storage medium comprising:

instruction to emit, from a networking unit of a computer system and towards a vehicle controller of a vehicle of interest located in a zone of interest, instructions to direct the vehicle of interest towards a specific replenishing station located in the zone of interest, whereby the specific replenishing station is assigned for replenishing an energy reserve of the vehicle of interest based on a set of statistical data defining a medium level of energy reserve, whereby the set of statistical data is in the form of a distribution or in the form of a cumulative density function, whereby the vehicle of interest is one of a plurality of vehicles located in the zone of interest, whereby the statistical data is collected over time from the plurality of vehicles;

instructions to define vehicle proportions based on the set of statistical data, the vehicle proportions comprising at least a longer trip proportion and a shorter trip proportion, whereby the vehicle of interest is related to a vehicle proportion in accordance with a level of energy reserve of the vehicle of interest, whereby a higher level of energy reserve relates to a longer trip proportion; and instructions to enforce the vehicle proportions of the plurality of vehicles using the statistical data such that a limited proportion of vehicles is maintained with an energy level of more than the medium level.

* * * * *